(12) United States Patent
Schweitzer, III et al.

(10) Patent No.: US 7,239,496 B2
(45) Date of Patent: Jul. 3, 2007

(54) DISTANCE PROTECTIVE RELAY USING A PROGRAMMABLE THERMAL MODEL FOR THERMAL PROTECTION

(75) Inventors: Edmund O. Schweitzer, III, Pullman, WA (US); Gabriel Benmouyal, Boucherville (CA); Michael B. Bryson, Pullman, WA (US)

(73) Assignee: Schweitzet Engineering Laboratories, Inc., Pullman, WA (US)

( * ) Notice: Subject to any disclaimer, the term of this patent is extended or adjusted under 35 U.S.C. 154(b) by 364 days.

(21) Appl. No.: 10/650,605

(22) Filed: Aug. 28, 2003

(65) Prior Publication Data
US 2005/0047043 A1   Mar. 3, 2005

(51) Int. Cl.
*H02H 5/04*   (2006.01)
(52) U.S. Cl. ..................................... 361/103
(58) Field of Classification Search ................. 361/103
See application file for complete search history.

(56) References Cited
U.S. PATENT DOCUMENTS

| | | | | |
|---|---|---|---|---|
| 4,806,855 A | * | 2/1989 | Davis | 324/127 |
| 5,559,430 A | * | 9/1996 | Seppa | 324/158.1 |
| 2003/0146725 A1 | * | 8/2003 | Griesemer et al. | 318/434 |

* cited by examiner

*Primary Examiner*—Brian Sircus
*Assistant Examiner*—Ann T. Hoang
(74) *Attorney, Agent, or Firm*—Cook, Alex, McFarron, Manzo, Cummings & Mehler, Ltd.

(57) ABSTRACT

The system includes a distance protective relay for power lines which includes a logic capability which is responsive to settings entered into the relay by an end user to implement the value of those settings into stored thermal model equations which emulate the temperature of the power line conductor. The logic within the relay is organized and has the capability of receiving the setting values entered by the user and to use those in the logic equations to determine the temperature of the conductor.

2 Claims, 4 Drawing Sheets

FIG. 4

| | | |
|---|---|---|
| 1 | PMV03 := 70.430000 | #CONDUCTOR LONGITUDE |
| 2 | PMV04 := 75.000000 | #LSTD |
| 3 | PMV05 := 0.500000 | #SAC |
| 4 | PMV06 := 0 | #VALUE OF DEFAULT SOLAR HEATING |
| 5 | PMV07 := 0 | #ESTIMATED OFFSET TEMPERATURE |
| 6 | PMV08 := 1.000000 | #DIAMETER |
| 7 | PMV09 := 45.560000 | #CONDUCTOR LATITUDE |
| 8 | PMV10 := 25 | #VALUE OF INITIAL TEMPERATURE |
| 9 | PMV11 := 0.02216 | #VALUE OF RAC CONDUCTOR RESISTANCE |
| 10 | PMV12 := 0.00008333 | # VALUE OF RDELT TEMPERATURE COEFFICIENT |
| 11 | PMV13 := 392.086 | # VALUE OF THC THERMAL HEAT CAPACITY |
| 12 | PMV14 := 1.859 | # VALUE OF TRA THERMAL RESISTANCE TO AMBIENT |
| 13 | PMV15 := 90 | #VALUE OF TH HIGH TEMPERATURE THRESHOLD |
| 14 | PMV16 := 80 | # VALUE OF TL LOW TEMPERATURE THRESHOLD |
| 15 | PMV17 := 0 | #ESTIMATED AMBIENT TEMPERATURE |
| 16 | PMV18 := RTD01 | #VALUE OF A TA AMBIENT TEMPERATURE |
| 17 | PSV05 := 1 | # STATE OF SGE SOLAR GENERATOR ENABLE |
| 18 | PSV06 := 1 | #STATE OF THERMAL SENSOR ENABLE |
| 19 | PSV18 := 1 | #STATE OF THERMAL TRIP ENABLE |
| 20 | PMV01 := DDOY | #DAY OF THE YEAR |
| 21 | PMV02 := THR + TMIN * 0.01666667 | # HOURS OF THE DAY |
| 22 | PMV20 := 23.450001 * SIN((284.000000 + PMV01) * 0.98630137) | #SUN DECLINATION |
| 23 | PMV21 := (PMV02 - 12.000000) * (-15.000000) | #LOCT |
| 24 | PMV22 := PMV21 + (PMV03 - PMV04) | #WS |
| 25 | PMV24 := SIN(PMV20) * SIN(PMV09) + COS(PMV20) * COS(PMV09) * COS(PMV22) | #COS(Z) |
| 26 | PMV25 := PMV24 * PMV24 | |
| 27 | PMV27 := 27682.000000 * PMV24 - 297.000000 - 4416 * PMV25 | |
| 28 | PMV25 := PMV24 * PMV25 | |
| 29 | PMV27 := PMV27 + 40023 * PMV25 | |

FROM FIG.4                                                                                                     FROM FIG.4

```
30   PMV25 := PMV25 * PMV24
31   PMV27 := PMV27 - 17469 * PMV25
32   PMV25 := PMV25 * PMV24
33   PMV27 := PMV27 + 2498 * PMV25
34   PMV28 := PMV27                                                      #SIR VALUE
35   PMV29 := PMV05 * PMV08 * PMV28                                      #QSUN VALUE
36   PSV01 := PMV29 >= 0
37   PMV30 := (PMV29 * 0.001) * PSV01
38   PSV08 := NOT PSV05
39   PMV30 := ((PMV29 * 0.001) * PSV01) * PSV05 + PMV06 * PSV08          #QSUN VALUE
40   PSV02 := PFRTEX                                                     #DETECTION OF FIRST PROCESSING INTERVAL
41   PSV03 := NOT PFRTEX
42   PMV35 := PMV10 * PSV02 + PMV35 * PSV03                              # INTRODUCTION OF THE TC INITIAL VALUE
43   PSV10 := (LIARMS >= LIBRMS) AND(LIARMS >= LICRMS)                   #STATE OF PHASE A LARGEST CURRENT
44   PSV11 := ((LIBRMS >= LIARMS) AND(LIBRMS > LICRMS)) OR ((LIBRMS > LIARMS) AND(LIBRMS >= LICRMS))
45   PSV12 := (((LICRMS >= LIARMS) AND(LICRMS > LIBRMS)) OR ((LICRMS > LIARMS) AND(LICRMS >= LIBRMS))
46   PMV19 := LIARMS * PSV10 + LIBRMS * PSV11 + LICRMS * PSV12           #CHOICE OF GREATEST RMS PHASE CURRENT
47   PSV07 := NOT PSV06
48   PMV32 := (PMV18 * PSV06 + PMV17 * PSV07) + PMV07                    #VALUE OF AMBIENT TEMPERATURE
49   PMV36 := ((PMV19 * PMV19) * (PMV11 + (PMV35 - 25) * PMV12)) * 0.001
50   PMV37 := ((PMV36 + PMV30) / PMV13) - ((PMV35 - PMV32) / (PMV13 * PMV14))
51   PMV38 := PMV37 * (0.00208333)                                       # TEMPERATURE INCREMENT
52   PMV35 := PMV35 + PMV38                                              # TEMPERATURE INTEGRATION
53   PCT10IN := PMV35 > PMV16                                            #DETECTION OF ALARM STATE
54   PCT10PU := 10
55   PCT10DO := 10
56   PCT11IN := (PMV35 > PMV15) AND PSV18                                #DETECTION OF TRIP STATE
57   PCT11PU := 10
58   PCT11DO := 10
```

DISTANCE PROTECTIVE RELAY USING A PROGRAMMABLE THERMAL MODEL FOR THERMAL PROTECTION

TECHNICAL FIELD

This invention relates generally to power line thermal protection, and more specifically concerns such thermal protection implemented with a first order thermal model emulating the temperature of the power line.

BACKGROUND OF THE INVENTION

Thermal protection for power lines is accomplished by monitoring the temperature of the wire conductor and generating a trip signal which opens a circuit breaker when the conductor temperature becomes greater than the maximum allowed temperature for the conductor. The temperature of the conductor is not measured directly, but is obtained by using a first order thermal model for the conductor. This involves using a heat balance equation (heat input minus heat losses) of a 1000 foot section of conductor.

The 1000 foot section of the line is assumed to have the highest temperature and to be exposed to the maximum solar radiation. The heat input portion in the equation is mainly due to heat dissipated in the conductor resistance and the solar heat gain. The heat loss portion is due primarily to convection and radiation. In general, the equations for establishing such a thermal model are well known, and the procedures for obtaining the temperatures of overhead conductors using a thermal model are set forth in IEEE Standard 738-1193, titled "IEEE Standard for Calculating the Current-Temperature Relationship of Bare Overhead Conductors".

A power line thermal model has been used previously in protective relays, although the thermal model equations are preestablished and the parameters thereof are determined by the manufacturer. The user has no control over the thermal model or its operation. It is an automatic process. This can lead to inaccurate results in some cases. Accordingly, it is desirable that the end user of a protective relay have some capability to itself establish the thermal model parameters for a more accurate and fast determination of power line temperature.

SUMMARY OF THE INVENTION

Accordingly, the present invention is a protective relay system for power line thermal protection, using programmable logic present within the relay, comprising: a protective relay for power lines, which includes a programmable logic capability by which the end user of the protective relay can enter operational settings which are then used by the relay in carrying out its thermal protection functions; a set of stored thermal model equations which emulate the temperature of a power line conductor, based on a plurality of individual setting values which are enterable into the relay by the end user, and wherein the logic implements the entered setting values into the thermal model equations which produce an emulated temperature of the conductor; and means for providing an indication when the temperature of the conductor exceeds a preselected value.

BRIEF DESCRIPTION OF THE DRAWINGS

FIG. 4 is an example of a program code for a thermal model.

BEST MODE FOR CARRYING OUT THE INVENTION

Figure 1:
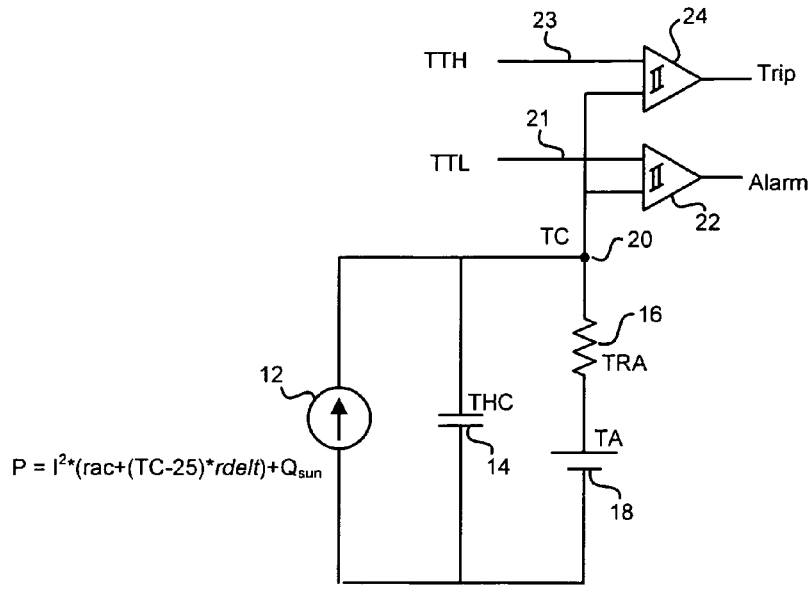
FIG. 1 is a block diagram showing a general implementation of a thermal model for determining temperature of a power line conductor.

As indicated above, use is made of first order thermal models to determine the temperature of electrical conductors, such as for instance the temperature in various parts of an induction motor. These principles are set out in a paper by S. E. Zocholl and Gabriel Benmouyal entitled "Using Thermal Limit Curves to Define Thermal Models for Induction Motors", *Proceedings of the 28th Annual Western Protective Relay Conference*, Spokane, Wash., October 2001. The first order thermal model for protection of a power line is expressed as first order differential equation:

$$\text{Power Supplied}(P)\text{-Losses} = \frac{d(TC)}{dt} \quad (1)$$

The equations below use the following variables:

P=heat power input to the conductor (kW/kft)
THC=conductor heat capacity (kJ/° C. kft)
TRA=thermal resistance to ambient (° C. kft/kW)
TC=estimated conductor temperature (° C.)
TA=ambient temperature (° C.)
TI=conductor initial temperature (° C.)
I=conductor current (A RMS)
rac=AC conductor resistance at 25° C. (Ω/kft)
rdelt=temperature coefficient of AC resistance (Ω/° C. kft)
$Q_{sun}$=heat power input from the sun (kW/kft)
$Q_{radiated}$=radiation heat losses (kW/kft)
$Q_{convected}$=convection heat losses (kW/kft)
Δt=processing interval or integration step (s)

Basically, the heating power supplied to the conductor can be expressed as:

$$P=(I^2 \cdot (rac)+(TC-25) \cdot rdelt)+Q_{sun}$$

Further, the heat losses from the conductor are expressed in the following equation:

$$\frac{TC-TA}{TRA} = Q_{radiated} + Q_{convected} \quad (3)$$

The conductor temperature differential equation is then:

$$THC\frac{dTC}{dt} = I^2 \cdot (rac+(TC-25) \cdot rdelt) + Q_{sun} - \frac{TC-TA}{TRA} \quad (4)$$

From Equation (4), the solution for the conductor temperature is obtained as follows:

$$TC(t) = \int_0^t \left( \frac{I^2 \cdot (rac + (TC - 25) \cdot rdelt) + Q_{sun}}{THC} - \frac{TC - TA}{TRA \cdot THC} \right) dT + TI \quad (5)$$

The equation is solvable numerically by computing the conductor temperature in successive time increments $\Delta TC$, to determine the conductor temperature.

$$\Delta TC = \left( \frac{I^2 \cdot (rac + (TC - 25) \cdot rdelt) + Q_{sun}}{THC} - \frac{TC - TA}{TRA \cdot THC} \right) \Delta T \quad (6)$$

The conductor temperature is determined successively as follows:

$$TC_{new} = \Delta TC + TC_{old} \quad (7)$$

The thermal model is illustrated in FIG. 1, where TTH is the maximum allowable temperature threshold, above which the circuit breaker for the power line can be tripped, while TTL is an alarm threshold. When $Q_{sun}$ is assumed to be a constant, and when t is infinite, the conductor temperature is represented by the following equation:

$$I = \sqrt{\frac{TTH - TA - Q_{sun} \cdot TRA}{(rac + (TTH - 25) \cdot rdelt) \cdot TRA}} \quad (8)$$

Referring to FIG. 1, the heat power into the conductor is represented by source 12, while THC (conductor heat thermal capacity) is represented by capacitor 14, TRA (thermal resistance to the ambient temperature value) is represented by resistance 16 and TA (ambient temperature) is represented by battery 18. The result of the thermal model is an estimated conductor temperature TC at output point 20. The temperature value at output point 20 is compared to the value of TTL (input 21) in comparator 22 to produce an alarm, and compared with the value TTH (input 23) in comparator 24 to produce a trip signal.

Several specific values in the above equations must be determined in order to solve the equations and complete the first order differential equation. The value of $Q_{sun}$ is determined by the following equation:

$$Q_{sun} = SAC \cdot DIA \cdot SIR \quad (9)$$

The variables in the determination of $Q_{sun}$ are set forth below.

d=solar declination (degrees)
n=days of the year (days)
Hrs=local time in hours (hours)
LocT=local time (degrees)
Ws=solar time (degrees)
SAC=solar absorption coefficient (unitless)
DIA=conductor diameter (inches)
z=solar zenith angle (degrees)
LSTD=standard time meridian (degrees west longitude)
LON=conductor longitude (degrees west longitude)
LAT=conductor latitude (degrees north latitude)
SIR=solar incident radiation (kW/in)
$Q_{sun}$=solar heating (kW/kft)

Referring to Equation 9, the value of SIR is typically provided by a look-up table as a function of the solar zenith angle. The solar zenith angle is determined indirectly by its cosine as a function of the solar declination d, the conductor latitude LAT and the solar time Ws as in the following equation:

$$\cos(z) = \sin(d) \cdot \sin(LAT) + \cos(d) \cdot \cos(LAT) \cdot \cos(Ws) \quad (10)$$

The value of the solar incident radiation (SIR) can then be computed using the following equation:

$$SIR = \alpha_5 \cdot \cos(z)^5 + \alpha_4 \cdot \cos(z)^4 + \alpha_3 \cdot \cos(z)^3 + \alpha_2 \cdot \cos(z)^2 + \alpha_1 \cdot \cos(z)^1 + \alpha_0 \quad (11)$$

Power n of $\cos(z)$ can be determined by multiplying the number n times by itself. The solar time Ws is provided as a function of the local time LocT, the longitude value LON and the standard time meridian LSTD as follows:

$$Ws = LocT + (LON - LSTD) \quad (12)$$

LocT is determined by a function of the local time expressed in hours, as set forth in the following equation:

$$LocT = (Hrs - 12) \cdot (-15) \quad (13)$$

The solar declination d can be expressed as a function of the day of the year n, as follows:

$$d = 23.45 \cdot \sin\left( \frac{284 + n}{365} \cdot 360 \right) \quad (14)$$

The local time and hours in the day of the year n would be both available within the relay as THR and DDOY. The conductor latitude LAT and longitude LON, along with the standard time meridian LSTD, must be entered as settings.

Another determination which must be made is the conductor thermal resistance TRA, which is determined by Equation 15 below:

$$TRA = \frac{TC - TA}{Q_{radiation} + Q_{convected}} \quad (15)$$

and is equal to the temperature difference between the conductor and the surrounding air, so that the heat transferred to the conductor is one unit of power.

The radiated heat losses can be computed as follows:

$$Q_{rad} = S \cdot E \cdot A \cdot (KC^4 - KA^4) \quad (16)$$

with the following variables:

$S$ = Stephan-Boltzman constant (W/° k$^4$ft$^2$)
  = 0.527e-8
$E$ = thermal emissivity constant (unitless)
  = 0.23 for new conductor
  = 0.91 for blackend conductor
$A$ = area of circumscribing cylinder (ft$^2$)
$KC$ = conductor temperature (° k)
$KA$ = ambient temperature (° k)

After adjusting the units, $$Q_{rad} = 0.138 \cdot DIA \cdot E \cdot \left[\left(\frac{KC}{100}\right)^4 - \left(\frac{KA}{100}\right)^4\right] \quad (17)$$

where DIA (the conductor diameter) is in inches and the units of $Q_{rad}$ are in kW/kft.

The value of the convected heat losses ($Q_{convected}$) is determined by the following equation:

$$Q_{conv} = \left[1.01 + 0.371\left(\frac{DIA \bullet R \bullet V}{H}\right)^{0.52}\right] \bullet K \bullet (TC - TA) \quad (18)$$

where the variables are:
R=air density (lb/ft$^3$)
V=air velocity (ft/hr)
H=absolute viscosity (lb/hr ft)
K=thermal conductivity (W/ft$^{2\circ}$ C.)

The value of thermal capacity (THC) is determined by multiplying the number of pounds of aluminum (WA) by the aluminum specific-heat and adding the number of pounds of steel (WS) multiplied by the steel specific heat, as in the following equation:

$$THC = \frac{WA \bullet 428.8 + WS \bullet 204.9}{100} \quad (19)$$

The above equations, as previously indicated, used to determine a thermal model, are known. However, previously a manufacturer of a protective relay, using such a thermal model for temperature determination of conductors, would directly provide all the specific variables at the factory and completely set up the thermal model in the relay for the customer. The customer thus has no ability to affect the thermal model in this arrangement. Frequently, however, this would be less than optimum, since the customer's use/location would likely increase the accuracy of the thermal model.

In the present invention, a protective relay includes a logic capability by which the user can directly program the thermal model equations in the relay. In order to provide the information necessary for determination of the thermal model, the following settings are made by the user. The first group of settings is the solar model settings.

Solar Model Settings
DSH=Default solar heating (kW/kft)
SAC=Solar absorption coefficient (unitless)
DIA=Conductor diameter (in)
LSTD=Longitude of time standard (degrees west longitude)
LON=Longitude of conductor (degrees west longitude)
LAT=Latitude of conductor (degrees north latitude)

The diameter of the conductor is corrected, both according to elevation and atmosphere, in accordance with the following equation:

$$DIA_{cor} = k_1 \cdot k_2 \cdot DIA \quad (20)$$

Values of $k_1$ and $k_2$ are shown in Tables I and II provided below.

TABLE I

| Elevation (ft) | k1 |
|---|---|
| 0 | 1.00 |
| 5000 | 1.15 |
| 10000 | 1.25 |
| 15000 | 1.30 |

TABLE II

| Atmosphere | k2 |
|---|---|
| Clean | 1.00 |
| Industrial | 0.82 |

The longitude of the time standard is entered according to Table III.

TABLE III

| Time Zone | Meridian |
|---|---|
| Eastern | 75° W |
| Central | 90° W |
| Mountain | 105° W |
| Pacific | 120° W |

Next, the thermal model settings as set forth below must be entered.
rac=AC resistance at 25° C. (Ω/k)
rdelt=temperature coefficient of AC resistance (Ω/° C. kft)
THC=thermal heat capacity (kJ/° C. kft)
TRA=thermal resistance to ambient (° C. kft/kW)

Next, the temperature settings must be entered. The estimated offset temperature EOT is the temperature difference between the ambient temperature available and the estimated hottest ambient temperature along the line. It must be entered as a number other than zero if it is estimated that a difference in fact exists. If not, it is entered at zero.
EAT=estimated ambient temperature (° C.)
EOT=estimated offset temperature (° C.)
TTH=high temperature threshold (° C.)
TTL=low temperature threshold (° C.)
TI=conductor initial temperature (° C.)
Lastly, the following logic switches must be set.
THE=thermal trip enable (1/O)
TSE=thermal sensor enable (1/O)
SGE=solar generator enable (1/O)

THE has to be set to 1 if the line is to be tripped due to excessive temperature; TSE is set to 1 if an external sensor is available for the ambient temperature. SGE is set to 1 if $Q_{sun}$ is computed from Equation (9). It is set to zero if $Q_{sun}$ is introduced as equal to DSH.

One example of a particular implementation is set forth below. A line conductor is made of Drake cable type with the following basic characteristics that can be extracted from tables:

Diameter  DIA = 1.108 in (k1 = k1 = 1.0)
Thermal emissivity constant  E = 0.5 (unitless)
AC resistance per mile at 25° C.  RL = 0.117 Ω/mile
AC resistance per mile at 75° C.  RH = 0.139 Ω/mile -continued

| | |
|---|---|
| Weight of aluminum 1000 ft of conductor | WA = 750 lb/kft |
| Weight of steel of 1000 ft of conductor | WS-344 lb/kft |

The value of rac, the conductor resistance per 1000 ft, is determined from the value of RL:

$$rac = \frac{RL}{5.28} = \frac{0.117}{5.28} = 0.022159 \; \Omega/\text{kft} \quad (21)$$

The value of rdelt, the conductor temperature coefficient, is computed from:

$$rdelt = \frac{RH - RL}{(75 - 25) \bullet 5.28} \quad (22)$$

$$= \frac{0.139 - 0.117}{50 \bullet 5.28}$$

$$= 0.0000833 \; \Omega/°\text{Ckft}$$

The thermal heat capacity is determined by multiplying the number of pounds of aluminum WA by the aluminum specific heat and adding the number of pounds of steel multiplied by the steel specific heat:

$$THC = \frac{WA \bullet 428.8 + WS \bullet 204.9}{1000} = 392.086 \; \text{kJ}/°\text{Ckft} \quad (23)$$

TRA is computed using equations 15 through 18 and using a conductor temperature of 90° C. and an ambient temperature of 40° C.

First, we compute the radiated power. From Equation 17, we have:

$$Q_{rad} = 0.138 \bullet E \bullet DIA \left[\left(\frac{KC}{100}\right)^4 - \left(\frac{KA}{100}\right)^4\right] \text{ or} \quad (24)$$

$$Q_{rad} = 0.138 \bullet 0.5 \bullet 1.108 \bullet \left[\left(\frac{363}{100}\right)^4 - \left(\frac{313}{100}\right)^4\right] \quad (25)$$

$$= 5.937 \; \text{kW/kft}$$

The convected power is computed from Equation 18 with the following assumed air constants:

R=Air density=0.0752 lb/ft³(20° C., sea level)
V=Air velocity=2 ft/sec=7200 ft/hr
H=Absolute viscosity–0.0439 lb/hr ft (20° C.)
K=Thermal conductivity=0.00784 watts/ft²° C.(20° C.)

$$Q_{conv} = \left[1.01 + 0.371\left(\frac{1.108 \bullet 0.0752 \bullet 7200}{0.0439}\right)^{0.52}\right] \bullet \quad (26)$$

$$0.00784 \bullet (90 - 40)$$

$$= 20.964 \; \text{kW/kft}$$

Finally, we have for TRA:

$$TRA = \frac{TC - TA}{Q_{rad} + Q_{conv}} = \frac{90 - 40}{5.937 + 20.964} = 1.859° \; \text{Ckft/kW} \quad (27)$$

The time constant of the first order thermal model is provided then as:

Thermal time constant=$THC \cdot TRA$=392.086·1.859=728.9$s$=12.15 mn (minutes) (28)

The practical meaning of this time constant is that if a step current is applied to the conductor, it will take 12.15 minutes for the conductor to reach 63% of the new steady-state temperature value.

Assume that the line is located in the Montreal (Canada) area. Also, assume the routine is started with the line open in summer time. The final set of settings that has to be introduced into the routine as constants as follows:

| | | |
|---|---|---|
| DSH | default solar heating = | 0 |
| SAC | solar absorption coefficient = | 0.5 |
| DIA | conductor diameter = | 1.108 |
| LSTD | longitude of time standard = | 75.00 |
| LON | longitude of conductor = | 73.43 |
| LAT | latitude of conductor = | 45.56 |
| rac | AC resistance at 25° C. = | 0.022159 |
| rdelt | temp. coeff. Of AC resistance = | 0.0000833 |
| THC | thermal heat capacity = | 392.086 |
| TRA | thermal resistance to ambient = | 1.859 |
| EAT | estimated ambient temperature = | 25 |
| EOT | estimated offset temperature = | 0 |
| TH | high temperature threshold = | 90 |
| TL | low temperature threshold = | 80 |
| TI | conductor initial temperature = | 25 |
| THE | thermal trip enable = | 0 |
| TSE | thermal sensor enable = | 1 |
| SGE | solar generator enable = | 1 |

Figure 2:
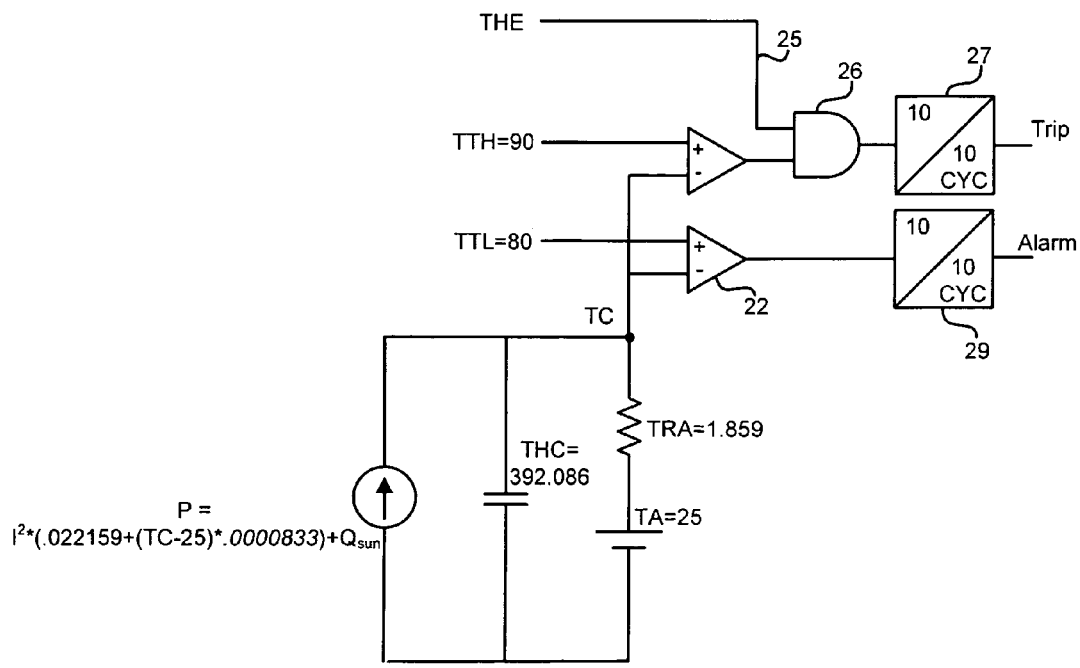
FIG. 2 is a block diagram of a particular example of a thermal model implementation.

FIG. 2 shows a block diagram for the above example to produce an alarm or a trip signal. The block diagram includes a thermal trip enable signal 25 to an AND gate 26 (with the output from the trip comparator). The output of AND gate 26 is applied to a timer 27, while the output of the alarm comparator 22 is applied to a timer 29. The timers 27 and 29 are conditioning timers with pick-up and drop-out times of 10 power signal cycles.

Figure 3:
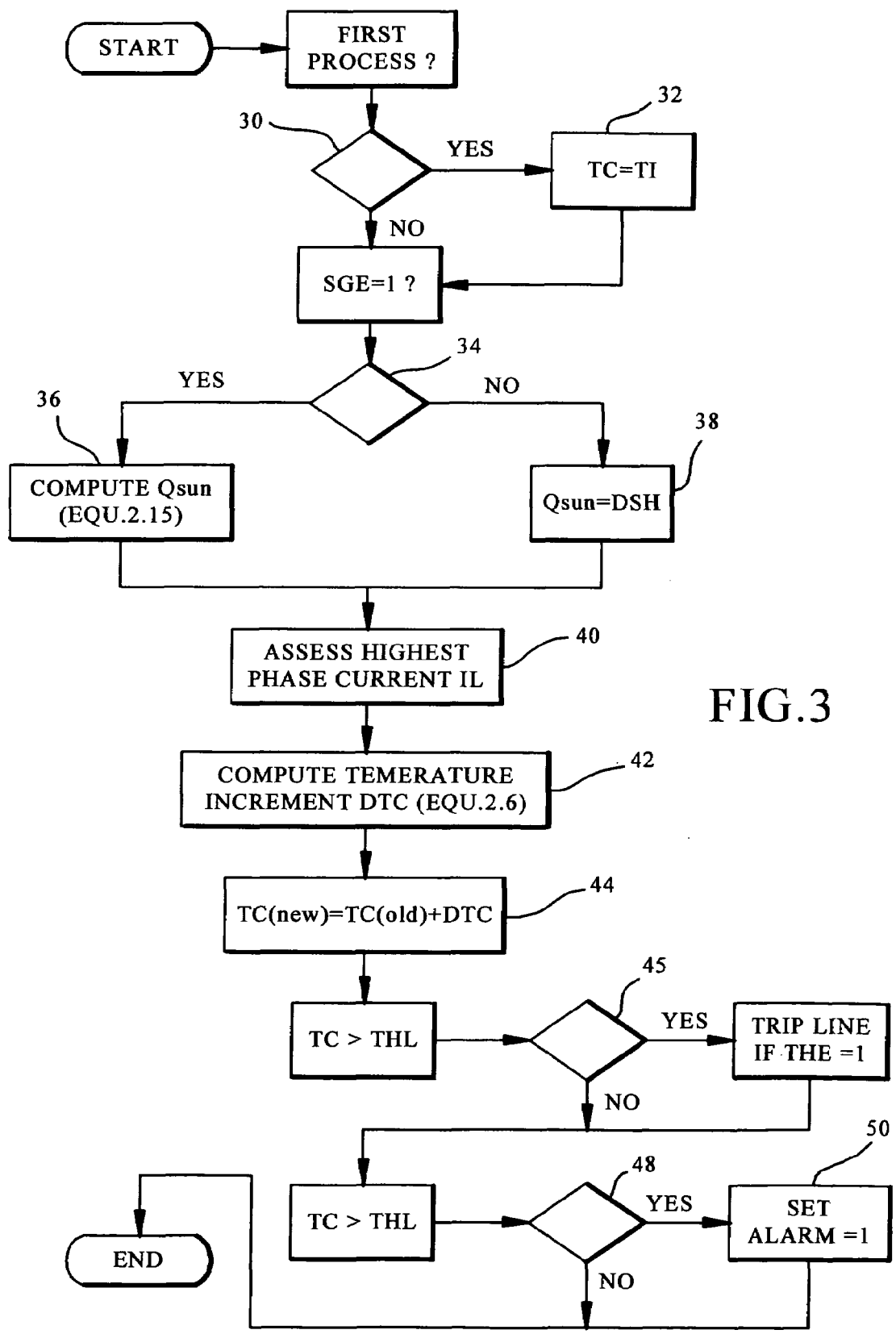
FIG. 3 is a block diagram of the processing used by a thermal model to produce a temperature value.

As indicated above, settings entered by the user, such as in the example above, are implemented into the thermal model by a logic program which is present in the relay. The requirements of one such logic program as an example are set forth below. The program flow chart for programming the relay to implement the user-defined thermal model in the relay is shown in FIG. 3.

At the start of the program sequence, it is first determined whether or not it is the first processing sequence for the thermal model, as shown at block 30. If yes, the initial conductor temperature is provided, at block 32. If not, then if SGE (solar generator enable) is equal to one, as determined at block 34, then $Q_2$, is computed at block 36, while if not, it is set to the DSH (default) value, at block 38. The largest of the three phase currents (A, B, C phase) is then chosen as the conductor current at block 40. The temperature is then calculated using the thermal model, at blocks 42 and 44. If the temperature is larger than the THL value (trip), as determined at block 45, then the circuit breaker on the line is tripped. If the temperature value is not equal to or above the trip threshold value but above the alarm value, as determined at block 48, then an alarm bit is set at block 50. The sequence is then ended. The sequence repeats itself at specific intervals.

As indicated above, applicants' invention includes the use of logic circuits and logic equations in the relay to accomplish a user programmable thermal model. In addition to the functional flow chart discussed above, one example of the logic coding to provide the programmable capability is shown in FIG. 4. In this example, lines 1–19 introduce the power line thermal element settings, lines 20–39 provide the computation of $Q_{sun}$, lines 40–42 provide the conductor initial temperature value, lines 43–46 determine the maximum phase current determination, lines 47–48 establish the ambient temperature, lines 49–52 establish the conductor temperature, lines 53–55 determine the alarm output and lines 56–58 determine the trip output.

The combination of the relay having the structure and capability of permitting the user to enter appropriate settings for a thermal model, along with the logic capability to implement those settings into the thermal model and then accomplish the calculation in accordance with the stored thermal model equations, results in a user-programmable thermal model system for protective relays.

Although a preferred embodiment of the invention has been described for purposes of illustration, it should be understood that various changes, modifications and substitutions may be incorporated in the embodiment without departing from the spirit of the invention which is defined in the claims which follow.

What is claimed is:

1. A protective relay system for power line thermal protection using programmable logic present within the relay with the capability of constructing associated logic equations, comprising:
    a protective relay for power lines, which includes a programmable logic capability by which the end user of the protective relay can enter settings which are then used by the relay in carrying out its thermal protection functions;
    a set of stored thermal model equations which when solved emulate the temperature of a power line conductor, based on a plurality of individual setting values which are enterable into the relay by the end user, the plurality of individual settings including solar model settings directed toward heating of the conductor affected by solar considerations, thermal model settings which are determined from physical aspects of the conductor and temperature settings, and wherein the solar model settings include a default solar heating value, a solar absorption coefficient, the conductor diameter, the longitude of time standard, the longitude of the conductor and the latitude of the conductor, wherein the thermal model settings for the conductor include its AC resistance at 25° C., the temperature coefficient of the AC resistance, the thermal heating capacity and the thermal resistance of the ambient temperature, and wherein the temperature settings include the estimated ambient temperature, the estimated offset temperature, the high temperature threshold, the low temperature threshold and the conductor initial temperature, and wherein the logic and logic equations implement the entered setting values into the thermal model equations which produce an emulated temperature of the conductor; and
    means for providing an indication when the temperature of the conductor exceeds a preselected value.

2. A protective relay system for power line thermal protection using programmable logic present within the relay with the capability of constructing associated logic equations, comprising:
    a protective relay for power lines, which includes a programmable logic capability by which the end user of the protective relay can enter settings which are then used by the relay in carrying out its thermal protection functions;
    a set of stored thermal model equations which when solved emulate the temperature of a power line conductor, based on a plurality of individual setting values which are enterable into the relay by the end user, and wherein the logic and logic equations implement the entered setting values into the thermal model equations which produce an emulated temperature of the conductor, and wherein the conductor temperature is expressed as a first order differential equation in accordance with $$P - L = THC \frac{dTC}{dt},$$

where P is equal to the heat power supplied to the conductor, L is the conductor heat losses, THC is the conductor heat thermal capacity and TC is the estimated conductor temperature, and wherein the heat power supplied to the conductor $=(I^2 \cdot (rac)+(TC-25) \cdot rdelt)+Q_{sun}$, where I is equal to the conductor current, rac is equal to the AC conductor resistance at 25° C., and rdelt is equal to the temperature coefficient of the AC resistance, Qsun is equal to the heat power input from the sun, and wherein the conductor heat losses are $Q_{radiated}+Q_{convected}$, the radiated heat losses and the convection heat losses; and p1 means for providing an indication when the temperature of the conductor exceeds a preselected value.

* * * * *

UNITED STATES PATENT AND TRADEMARK OFFICE
CERTIFICATE OF CORRECTION

| | | |
|---|---|---|
| PATENT NO. | : 7,239,496 B2 | Page 1 of 1 |
| APPLICATION NO. | : 10/650605 | |
| DATED | : July 3, 2007 | |
| INVENTOR(S) | : Edmund O. Schweitzer, III, Gabriel Benmouyal and Michael B. Bryson | |

It is certified that error appears in the above-identified patent and that said Letters Patent is hereby corrected as shown below:

First word of assignee's name is listed as "Schweitzet" but should be --Schweitzer--.

Signed and Sealed this

Twenty-eighth Day of August, 2007

JON W. DUDAS
*Director of the United States Patent and Trademark Office*